US009348663B1

(12) United States Patent
Boodman et al.

(10) Patent No.: US 9,348,663 B1
(45) Date of Patent: May 24, 2016

(54) SCHEMA VALIDATION FOR SECURE DEVELOPMENT OF BROWSER EXTENSIONS

(71) Applicant: GOOGLE INC., Mountain View, CA (US)

(72) Inventors: Aaron Boodman, San Francisco, CA (US); Rafael Weinstein, San Francisco, CA (US); Erik Kay, Emerald Hills, CA (US); Matthew Perry, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/267,115

(22) Filed: May 1, 2014

Related U.S. Application Data

(63) Continuation of application No. 13/110,797, filed on May 18, 2011, now Pat. No. 8,756,617.

(60) Provisional application No. 61/346,013, filed on May 18, 2010, provisional application No. 61/345,999, filed on May 18, 2010, provisional application No. 61/346,000, filed on May 18, 2010.

(51) Int. Cl.
*G06F 9/54* (2006.01)
*G06F 11/07* (2006.01)

(52) U.S. Cl.
CPC .............. *G06F 9/54* (2013.01); *G06F 11/0766* (2013.01)

(58) Field of Classification Search
CPC ....... G06F 21/53; G06F 9/44526; G06F 9/54; G06F 11/0766
See application file for complete search history.

(56) References Cited

U.S. PATENT DOCUMENTS

| 5,974,549 | A | 10/1999 | Golan |
| 5,983,348 | A | 11/1999 | Ji |
| 2002/0129000 | A1 | 9/2002 | Pillai et al. |
| 2004/0054918 | A1 | 3/2004 | Duri et al. |
| 2005/0039197 | A1 | 2/2005 | Ahmad et al. |
| 2005/0138648 | A1 | 6/2005 | Ahmed et al. |
| 2006/0259973 | A1* | 11/2006 | Sima et al. ..................... 726/25 |
| 2007/0016949 | A1 | 1/2007 | Dunagan et al. |
| 2007/0233686 | A1 | 10/2007 | Bernabeu et al. |
| 2007/0239985 | A1 | 10/2007 | Bernabeu et al. |
| 2007/0256003 | A1 | 11/2007 | Wagoner et al. |
| 2008/0313648 | A1 | 12/2008 | Wang et al. |
| 2009/0141299 | A1 | 6/2009 | Osada |
| 2010/0037317 | A1 | 2/2010 | Oh |

(Continued)

OTHER PUBLICATIONS

Advisory Action for U.S. Appl. No. 13/110,797, mailed Oct. 29, 2013, 3 pages.

(Continued)

*Primary Examiner* — Syed Roni
(74) *Attorney, Agent, or Firm* — Brake Hughes Bellermann LLP

(57) ABSTRACT

An extension schema validator may be executable within an extension process of an extension of a browser application, and may be configured to validate the extension with respect to an extension application program interface (API) that is provided in conjunction with the browser application for implementation of the extension. A browser schema validator may be executable within a browser process of the browser application, and may be configured to validate the extension with respect to the extension API. Successful validation of the extension by the extension schema validator prior to attempting validation of the extension by the browser schema validator may be required.

20 Claims, 5 Drawing Sheets

(56) References Cited

U.S. PATENT DOCUMENTS

| | | |
|---|---|---|
| 2010/0199169 A1 | 8/2010 | Gnech et al. |
| 2010/0281537 A1 | 11/2010 | Wang et al. |
| 2011/0047613 A1 | 2/2011 | Walsh |

OTHER PUBLICATIONS

Final Office Action Response for U.S. Appl. No. 13/110,797, filed Oct. 15, 2013, 16 pages.

Notice of Allowance for U.S. Appl. No. 13/110,797, mailed Feb. 3, 2014, 13 pages.

Final Office Action for U.S. Appl. No. 13/110,797, mailed Jul. 12, 2013, 34 pages.

Non-Final Office Action Response for U.S. Appl. No. 13/110,797, filed May 8, 2013, 13 pages.

Non-Final Office Action for U.S. Appl. No. 13/110,797, mailed Feb. 6, 2013, 23 pages.

RCE and Final Office Action Response for U.S. Appl. No. 13/110,797, filed Jan. 10, 2014, 13 pages.

Cover, "Schematron: XML structure validation language using patterns in trees", Jan. 2006, 19 pages.

McCloud, et al, "Google Chrome—Behind the Open Source Browser Project", pub. 2008, 40 pages.

Pilgrim, "Dive Into Greasemonkey", May 9, 2005, 99 pages.

Zyp, "Unobtursive Javascript typing via JSON schema interfaces", Jun. 23, 2009, 8 pages.

* cited by examiner

SCHEMA VALIDATION FOR SECURE DEVELOPMENT OF BROWSER EXTENSIONS

CROSS REFERENCE TO RELATED APPLICATIONS

This application is a Continuation of, and claims priority to, U.S. patent application Ser. No. 13/110,797, filed on May 18, 2011, entitled "Schema Validation For Secure Development of Browser Extensions", now U.S. Pat. No. 8,756,617, issued on Jun. 17, 2014, which, in turn, claims the benefit, under 35 U.S.C. §119, of U.S. Provisional Patent Application No. 61/345,999, filed on May 18, 2010, entitled "Installable Web Applications", U.S. Provisional Patent Application No. 61/346,000, filed on May 18, 2010, entitled "Web Store for Digital Goods", and U.S. Provisional Patent Application No. 61/346,013, filed on May 18, 2010, entitled "Chrome Extensions", the disclosures of which are incorporated by reference herein in their entirety.

TECHNICAL FIELD

This description relates to browser extensions.

BACKGROUND

Browsers typically enable users to interact with and experience many different types of content, usually over a computer network, and often in a visual or graphical manner. For example, users may install one or more internet browsers on a local computing device, and may thereafter utilize the internet browser to access content and/or functionality provided by a remote computing device.

Many browser applications provide a user with an ability to customize or personalize appearance or functionality of the browser application in a manner desired by the user. In this way, the user may be more likely to enjoy, or benefit from, the use of the browser application. In particular, many browser applications support the use of discrete programs or files which are designed to provide a specific addition and/or alteration of one or more functionalities of an associated browser application. Such programs may be referred to using various, well-known terminologies, such as, for example, extensions, add-ons, or web apps (or just apps).

One of the features and advantages of such extensions is that users of the browser application may easily create or otherwise develop various types and kinds of such extensions. For example, a provider of a browser application may include functionality and content associated with the browser application, which enable a user thereof to create and utilize a specific type of extension that the user may desire. Moreover, in this regard, the provider of the browser application may provide additional code or other content which is designed to facilitate an ability of the user to develop extensions having a wide variety of features and functions. Thus, users may be enabled to develop such extensions, for their enjoyment and/or for the enjoyment of other users, in a manner which is straightforward and which does not require extensive programming knowledge on the part of the user.

As referenced, then, such extension applications may, by their nature, interact with the browser application and/or with content rendered by the browser application (e.g., a webpage). As a result, such extension applications are known to pose a potential security risk with respect to, e.g., a stable operation of the browser application (or related application), a confidential nature of data of the user, or with respect to other undesired actions which may be caused by malicious developers wishing to take advantage of the above-referenced nature of the types of browsers/extension platforms described above. Moreover, efforts to limit an ability of such malicious developers to leverage the open nature of such browser/extension platforms may result in limiting, to some extent, the open nature itself, and/or may negatively impact an ability of non-malicious users who wish to benefit from the features and advantages provided by such platforms.

SUMMARY

According to one general aspect, a computer system may include instructions stored on a computer-readable medium that are executable by at least one processor. The computer system may include an extension schema validator that is executable within an extension process of an extension of a browser application, the extension schema validator configured to cause the at least one processor to validate the extension with respect to an extension application program interface (API) that is provided in conjunction with the browser application for implementation of the extension. The computer system may include a browser schema validator executable within a browser process of the browser application, the browser schema validator configured to cause the at least one processor to validate the extension with respect to the extension API. Successful validation of the extension by the extension schema validator may be required prior to attempting validation of the extension by the browser schema validator.

According to another general aspect, a computer program product may be tangibly embodied on a computer-readable medium and may include executable code that, when executed, is configured to cause a data processing apparatus to provide an extension schema validator executable within an extension process of an extension of a browser application, the extension schema validator configured to validate the extension with respect to an extension application program interface (API) that is provided in conjunction with the browser application for implementation of the extension. The executable code, when executed, is further configured to cause the data processing apparatus to provide a browser schema validator executable within a browser process of the browser application, the browser schema validator configured to validate the extension with respect to the extension API. Successful validation of the extension by the extension schema validator prior to attempting validation of the extension by the browser schema validator may be required.

According to another general aspect, a computer-implemented method may include executing instructions stored on a computer-readable medium. The method may include providing an extension schema validator executable within an extension process of an extension of a browser application, the extension schema validator configured to validate the extension with respect to an extension application program interface (API) that is provided in conjunction with the browser application for implementation of the extension, providing a browser schema validator executable within a browser process of the browser application, the browser schema validator configured to validate the extension with respect to the extension API, and requiring successful validation of the extension by the extension schema validator prior to attempting validation of the extension by the browser schema validator.

The details of one or more implementations are set forth in the accompa-nying drawings and the description below.

Other features will be apparent from the description and drawings, and from the claims.

DETAILED DESCRIPTION

Figure 1:
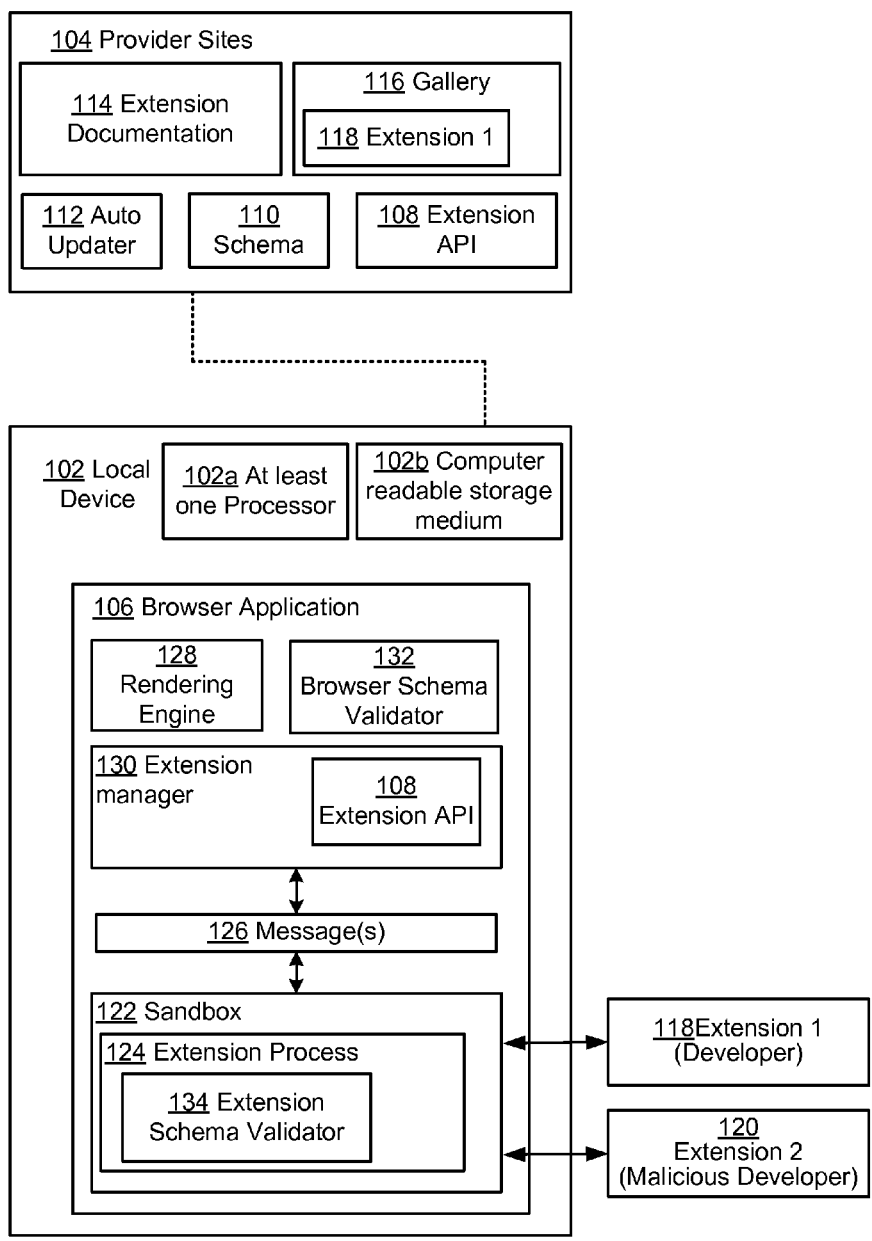
FIG. 1 is a block diagram of a system for providing secure extension development.

FIG. 1 is a block diagram of a system 100 for providing secure extension development. More specifically, as described in detail herein, the system 100 provides an ability to restrict or eliminate attempts by malicious extension developers to negatively affect users of the system 100 (and related systems). Moreover, the system 100 enables providers of browser applications (and associated extensions) to enable a wide variety of such extensions for the use and enjoyment of browser users, in a manner which is easy and straightforward for the providers, and which maximizes an ability and opportunity of non-malicious extension developers, and other users, to benefit from such extensions.

In the example of FIG. 1, a local computing device 102 is illustrated as communicating with one or more provider sites 104. As may be appreciated by one of skill in the art, the local computing device 102 may generally represent virtually any computing device which may be configured to execute an otherwise conventional browser application 106, and to communicate with (e.g., access) the provider sites 104. For example, the local computing device 102 may include a standard desktop or personal computing device, or a laptop, notebook, or netbook computer, any tablet computer, or any Smartphone or other mobile computing device. Such computing devices, and other computing devices, may be configured to access the provider sites 104 using one or more computing networks, in any conventional manner. For example, many such local computing devices 102 may include various types of network-related hardware/software which enable the local computing device 102 to communicate over the public internet, a private intranet, or other network, to thereby access the provider sites 104.

In the example of FIG. 1, the provider site 104 may be understood to be associated with a provider of the browser application 106. That is, as is well known, a number of such browser providers exist within the marketplace, which offer respective browsers having various proprietary features, functions, and characteristics. Such browsers may include, for example, the Chrome browser, the Internet Explorer browser, the Mozilla Firefox browser, or the Safari browser.

As referenced above, such browser providers may wish to enable their respective browser applications to be modified by various extension programs, which may thus be referred to by various names, which may generally correspond to the respective browsers, such as, for example, extensions, extension applications, web applications, webapps, apps, add-ons, Active-X controls, and various other terminologies. Thus, it may be appreciated that the various different types of such applications may have the same or similar functionality, at least conceptually. At the same time, it may be appreciated that such applications also may vary widely in both the types of features/functions that are offered, as well as a manner in which such features/functions are provided.

Thus, in a simplified example, it may occur that a new browser provider creates and deploys the browser application 106, which may have many conventional browser features and functions, as well as a number of additional or alternative browser characteristics which may be unique and/or proprietary to the browser provider. The browser provider may further wish to enable the browser application 106 to utilize the types of extension applications described herein. Consequently, for example, the browser provider may create and deploy an extension application program interface (API) which may be associated with one or more specific extension functionalities.

For example, as a first such extension, the provider may create the extension API 108 to enable access to a bookmarks feature of the browser application 106, and thereby enable future extension developers to modify or enhance such a bookmark feature in a desired manner. As another example, a different extension may be provided such that the extension API 108 may represent, for example, an ability to modify the browser application 106 to provide an icon or other visual element which would not otherwise be present within the browser application 106, and which may be associated with a specific, desired functionality that is defined by a particular extension developer. Many other types of such extension applications, and associated extension APIs are well known, and therefore are not described here in detail, except as may be necessary or helpful in understanding operations of the system 100 of FIG. 1.

As would be well known to one of skill in the art, the extension API 108 may have a number of specific characteristics which are used to provide the above-referenced features and functionalities. For example, the extension API 108 may include a variety of defined data types, arguments, or other types of content, where each such type of content, and specific instance thereof, may be associated with corresponding value(s), or range(s) of values. For example, a first data type may expect an integer value as compared to a string value, while a first argument may require values to be within a specified minimum and maximum numerical range.

As is well known, developers who wish to make use of the extension API 108 in developing associated extensions, must conform to such definitions in an appropriate manner, in order to obtain successful, desired outcomes with respect to developed extensions. However, particularly with respect to long and/or complex extension APIs 108, it may be difficult for such extension developers to conform to the requirements and definitions of the extension API 108 in question, particularly if the extension developer in question is not particularly experienced in the field of software development. Moreover, even for experienced software developers such as those who may be associated with the provider of the browser application 106, it may be difficult to construct the extension API in a manner which is internally consistent, and which is clear and definite with regard to the manner in which the extension API 108 enables future extension developers to utilize the browser features and functions which are intended to be provided in a desired manner.

As a result, in the example of FIG. 1, a schema 110 may be provided which may be used in constructing, deploying, and utilizing the extension API 108 in a desired manner. For example, the schema 110 may represent an instance of an overall extension schema designed for the purpose of defining a manner in which extension APIs, such as the extension API 108, may be created and deployed. For example, such an overall extension schema 110 may describe a syntax, semantic, grammar, or other manner of permitted formulation of content within extension APIs, including various functions, API calls or other API interactions, and permitted combinations thereof. Further, the extension schema 110 may provide various types of, as referenced above, data types, arguments, and other content that may be included within extension APIs, as well as permitted values, ranges, or boundaries associated therewith.

Thus, such an extension schema 110 may grow over time (and/or new extension schemas may be added), as the browser provider in question extends the number and type of extensions to be offered to developers and other users. Then, for any particular extension API (or portion thereof), such as the extension API 108, which the provider wishes to make available to the developers and other users, a subset of the extension schema may be implemented as the schema 110 which is tailored to the extension API 108 in question. More generally, it may be appreciated that, in some implementations, a single schema may be applicable to a large number and type of extension APIs, or, in other example implementations, such schemas may be tailored specifically to a smaller group of extension APIs, or to a single extension API.

Consequently, at a time of development of the extension API 108, it may occur that the schema 110 is utilized to perform validation of the extension API 108 with respect to conformance thereof with the schema 110 in question. For example, such schema validation may proceed with ensuring that all included data types, arguments, and other content included within the extension API 108 match allowable versions thereof as defined by the schema 110. Generally, the schema validation may seek to ensure that the various types, values, ranges, and boundaries, and other characteristics of the extension API 108 are defined and included in a manner which is in conformance with the schema 110. In this way, the developer and provider of the extension API 108 may easily be provided with confidence that the extension API 108 is fully operational in a desired manner. Moreover, as referenced below, the developer of the extension API 108 may be provided with specific information as to a manner in which the extension API 108 may fail to completely conform to the schema 110, so that corrective action may be taken.

The schema 110 also represents an opportunity for the developer of the extension API 108 to fully describe and document specific and general features of the extension API 108. That is, for example, the schema 110 may generally include description of a particular argument and associated range, including a manner in which the argument in question may be used in resulting extensions. Then, if the extension API 108 includes the argument, the schema 110 automatically provides related documentation. At a later time, if a second extension API 108' is developed which uses the same argument, but perhaps in a different context or in combination with different arguments, the schema 110 may nonetheless be used to extract and compile the relevant definitional and documentation information for each of the two extension APIs in question.

More specifically, in the example of FIG. 1, an auto updater 112 is illustrated which may be configured to access the schema 110 with respect to the extension API 108. Further, the auto updater 112 may extract relevant definitional and documentation information associated with the combination of the schema 110 and the extension API 108, so as to thereby derive and determine a description of the extension API 108 which is specifically tailored thereto.

Moreover, as illustrated, the auto updater 112 may be configured to upload such extension documentation 114 within the context of the provider sites 104. That is, it may be appreciated that the extension API 108, the schema 110, and the auto updater 112 may represent associated hardware and/or software associated with the provider sites 104, and that the resulting extension documentation 114 represents the corresponding documentation content and/or a providing of such content to an intended audience (e.g., the public), for example, over the internet.

Thus, in a specific example, it may occur that the provider of the browser application 106 provides a website of the provider sites 104 at which the browser application 106 may be downloaded or otherwise accessed by current or potential users thereof. In conjunction with such a website, the provider may provide a gallery 116 of all available extensions which may be downloaded and utilized by any accessing user. Thus, similarly, in conjunction with (or separately from) such websites, the extension documentation 114 may be provided to potential extension developers who wish to utilize available extension APIs 108, e.g., in order to develop new extension applications. As is well known, such developers may then utilize such new extensions for their private use (e.g., at the local computer 102), or, if desired, may publish the new extension application(s) to the gallery 116 for use and enjoyment thereof by a wide audience of potential users.

For example, in the specific example of FIG. 1, an example extension 118 is illustrated as being associated with a particular extension developer. That is, it may occur that a developer wishes to utilize the extension API 108, and other relevant extension APIs, in order to construct a new, desired extension, i.e., the extension 118.

For purposes of the example, the developer of the extension 118 may be assumed to be a typical, non-malicious developer who simply wishes to create the extension 118 for his or her own enjoyment, or for the enjoyment of others (e.g., via the gallery 116). In contrast, for the sake of the example, a second extension 120 is also illustrated, and is further illustrated as being associated with a malicious developer who wishes to utilize the second extension 120 as a vehicle or means for achieving a result that is undesired and/or detrimental to other users, and/or to the provider of the browser application 106, or that is not permitted or allowed by the provider.

Specific example operations of the provider in developing and deploying the extension API 108 are provided in detail below, e.g., with respect to FIG. 3. Similarly, specific actions of the developer and malicious developer with respect to the extensions 118, 120 are provided in detail below, e.g., with respect to FIG. 4.

In general, however, it may be appreciated that implementation of the system 100 may proceed with the developer of the extension 118, and/or the malicious developer of the extension 120, visiting one or more of the provider sites 104, e.g., to view the extension documentation 114 and/or the gallery 116, in order to determine existing and potential extension applications. For example, as would be appreciated, any such developer may utilize the local browser application 106 to view a corresponding browser window (not specifically illustrated in the example of FIG. 1), and thereby access websites displaying or otherwise providing the content associated with the extension documentation 114 and/or the gallery 116. Further, such developers may utilize a browser application 106 to download, if necessary, the extension API 108, the schema 110, or any other content which may be useful to such developers in developing desired extension applications. Of course, as also may be appreciated, in some instances it may be preferred or required for such developers to access and utilize some or all such content remotely, rather than downloading in the manner just referenced.

In the example of FIG. 1, the system 100 implements a multi-process architecture in which processes of the browser application 106 (e.g., processes including loading, rendering, and displaying webpages or other content) are separated from, e.g., execute in a different process from, extension applications that have been developed for use in conjunction with the browser application 106. More specifically, as shown, a sandbox 122 may be used which is separate from the various browser processes of the browser application 106, and which contains an extension process 124 executing therein in conjunction with a given one of the extensions 118, 120 which may be currently executing and/or in development.

Generally speaking, such separation of the extension process 124 from processes of the browser 106 provides a high level of security and stability for the various browser processes. For example, because the extension process 124 is separate, a malfunction or termination of the extension process 124 may be highly unlikely to result in a disruption of any process of the browser application 106. Further, as referenced above, many actions of the extension process 124 may be understood to relate to requests for the browser application to perform some function on the extension's behalf. As a result, such interactions between the extension process 124 and the browser application 106 might result in an ability of the extension process 124 to affect the operation of the browser application 106 in a negative manner. For example, the malicious developer of the extension 120 might, if possible, wish to utilize such interactions between the extension process 124 and the browser application 106 to obtain some illicit or undesired result.

In the multi-process architecture of FIG. 1, however, the separation of the extension process 124 from processes of the browser application 106, using the sandbox 122, may effectively prevent such malicious actions. Instead, as shown, the extension process 124 may communicate with the browser processes using one or more messages 126.

Notwithstanding the above-referenced features and advantages of the multi-process architecture of the system 100, other possibilities remain for the malicious developer of the extension 120 to obtain an illicit response or effect with response to, e.g., operations of the browser application 106. For example, as shown, the browser application 106 may include a rendering engine 128 which is configured to, for example, render or otherwise process or display content received from remote computers for providing to a user by way of an appropriate browser window. The use and operation of such rendering engines are generally well known, and are therefore not described here in further detail, except as may be necessary or helpful in understanding operations of the system 100 of FIG. 1.

In general, however, it may occur that the malicious developer of the extension 120 may identify a bug, unintentional or undesired functionality, or other aspect of the rendering engine 128 which the malicious developer may desire to exploit in order to obtain a specific malicious result. For example, it may occur that the extension 120 involves the functionality of asking a browser window of the browser application 106 to direct itself to a specified URL, which may then be accessed and rendered using the rendering engine 128. Therefore, the malicious developer may seek to use the extension 120 to provide an incorrect or undesired URL or other information which the rendering engine 128 may thus attempt to use to point the browser window accordingly. Depending on the input provided by the malicious developer by way of the extension 120, a result may include an unstable or unworkable operation of the browser application 106, and may therefore result in varying levels of disruption to the use thereof.

Further with respect to the example of FIG. 1, the browser application 106 may include or be associated with an extension manager 130. In general, the extension manager 130 may be understood to provide various features which enable the creation, use, and management of extension applications associated with the browser application 106. For example, the extension manager 130 may enable a developer or other user of the browser application 106 to see a list of all available extensions, as well as which extensions are currently installed and/or executing. In addition to various other features known to be associated with such extension managers, the extension manager 130 may be instrumental in injecting particular types of codes or scripts associated with extension applications into the browser processes associated with the rendering engine 128. That is, as referenced above, the multi-process architecture of FIG. 1 generally separates the extension process 124 from such browser processes. However, some extensions may be enabled or desired to interact with actual content of webpages or other content to be rendered by the rendering engine 128. For example, such code may be referred to as content script, which may be loaded into the rendering engine 128 in conjunction with a particular, current webpage, and may execute in conjunction therewith.

In some example implementations, the extension manager 130 may be instrumental in creating separate execution environments for such content scripts, relative to, e.g., page scripts that are associated with the particular page being rendered by the rendering engine 128. Nonetheless, it may be appreciated that, in some instances, such as referred to above, various bugs, mistakes, or other unintended or undesired aspects of the rendering engine 128, the extension manager 130, or any aspect of the browser application 106, may provide an entry for the malicious developer to leverage such unintended aspects of the browser application 106 for illicit, malicious results.

As referenced above, the schema 110 and associated validation techniques may be instrumental in enabling providers, developers, and other users to determine a validity or other correctness of the extension API 108 and associated extensions in an automatic, simplified, consistent, and reliable manner. As a result, it may be possible, as illustrated in the example of FIG. 1, to implement a browser schema validator 132 in the context of browser processes of the browser application 106.

That is, as described above with respect to the provider sites 104, it may occur that the browser scheme validator 132 may be configured to examine the message 126 and other aspects of the extension API 108 as used in the context of the extension 118, 120, so as to determine, for example, a semantic, syntax, grammar, type, range, or other characteristics thereof, so as to thereby determine a propriety of the extension under development. Thus, for example, if the browser schema validator 132 determines that a particular value is outside of a permitted range or boundary in the context of the messages 126, for example, then, as described above with respect to the schema 110 in the context of the provider sites 104, the browser schema validator 132 may return an error message.

However, by itself, the browser schema validator 132 may find it difficult or impossible to distinguish between an error which occurs in the context of the extension 118 of the developer thereof, as compared to the extension 120 developed by the malicious developer. In other words, both such developers may provide such an incorrect value with respect to the extension API 108; however, such an incorrect value would represent an honest error on the part of the developer of the extension 118, but would represent an attempt to breach security on the part of the malicious developer of the extension 120. As a result, by itself, the browser schema validator 132 may be forced either to be overly restrictive with respect to permitting and processing schema validation errors (i.e., for fear of permitting malicious activity on the part of the malicious developer), at a cost of inconveniencing the developer of the extension 118, or choose not to be restrictive with respect such a validation scheme of errors, at the risk of permitting malicious activity on the part of the malicious developer of the extension 120.

In the example of FIG. 1, however, in the multi-process architecture of the system 100 as described herein, the extension process 124 may be provided with an extension schema validator 134 which executes in the context thereof. That is, the extension schema validator 134 may be understood to be conceptually similar or identical to the browser schema validator 132 (and in some cases may be literally the same as, or identical to, the browser schema validator 132), and to corresponding validation techniques executed with respect to the schema 110 at the provider sites 104, but may be implemented independently within the context of the extension process 124. As a practical matter, however, it may occur that the extension schema validator 134 is written somewhat differently from the browser schema validator 132, even though their conceptual operations and results may be similar or the same. For example, the extension process 124 may execute using JavaScript, and the extension schema validator 134 may thus be written for schema validation in that context, while the browser processes may occur partially or completely in a different language, e.g., C++, so that the browser schema validator 132 may be constructed accordingly. As referenced above, in some implementations, the schema validators 132, 134 may be written in/for the same language, as well.

By virtue of the location of the validators 132, 134 relative to the multi-process architecture of the system 100, the system 100 may be enabled to provide a two-level or two-layer validation scheme, which may enable identification and detection of malicious actions on the part of the malicious developer of the extension 120, relative to actions (including mistakes) of the developer of the extension 118. Consequently, the system 100 may enable restriction or elimination of malicious actions on the part of the malicious developer of the extension 120, while assisting (or at least not hindering) efforts of the developer of the extension 118.

For example, during development or operation of the extension 118, the extension schema validator 134 may detect an argument value which is out of a permitted range, or which has an unpermitted characteristic. For example, the extension schema validator 134 may determine that a URL format provided in conjunction with the extension 118 and designed to cause an action of the rendering engine 128 to render the provided URL, may not match a specified, permitted URL format. Consequently, the extension schema validator 134 may return an error message to the developer of the extension 118. Specifically, the extension schema validator 134 may provide an error message which identifies the particular error detected, and possibly a suggested correction or type of correction that may be applied to address the detected error.

As a result, the developer of the extension 118 may be enabled to correct the unintentional error, and therefore proceed with development and execution of the extension 118. During such development and execution, the extension process 124 may interact with the browser processes of the rendering engine 128 or other processes of the browser application 106, e.g., by way of the messages 126. Since the previous errors of the developer of the extension 118 already were corrected in the context of the extension process itself, the browser schema validator 132 should detect no errors, and the extension process 124 may thus continue in conjunction with browser processes of the browser application 106.

In contrast, with respect to the malicious developer of the extension 120, a similar situation may occur in which the extension 120 purports to provide a URL or related content. However, in this context, the malicious developer may purposely alter the permitted format or content, in an attempt to obtain a malicious result with respect to future operations of the browser application 106. Nonetheless, as just described above, the extension schema validator 134 may detect the incorrectly formed extension argument or other characteristic, and may return an error message to the malicious developer of the extension 120.

However, as referenced above, the malicious developer 120 may be aware of a bug or other error, e.g., inadvertently included in the browser application 106 by the provider thereof. Consequently, the malicious developer may seek to leverage such information to circumvent or bypass the requirement of the schema 110 with respect to the incorrectly formed argument, value, or other characteristic of the extension 120. As a result, the malicious developer of the extension 120 may be successful in bypassing or circumventing the extension schema validator 134, and may thus proceed with development and execution of the extension 120, e.g., including exchange of messages 126 with processes of the browser application 106.

Subsequently, the browser schema validator 132 may thus detect the same or similar error with respect to the messages 126 or other action with the extension process 124 as was previously detected by the extension schema validator 134. As a result, the browser schema validator 132 may infer that the extension schema validator 134 must have been bypassed or circumvented, e.g., in order for the browser schema validator 132 to receive a message 126 which contains the detected schema validation error. Consequently, the browser schema validator 132 may deduce or infer that the extension associated with the erroneous message or other API error may be malicious, and may therefore react appropriately. For example, the browser schema validator 132 or other browser process may subsequently take action to terminate the extension process 124 from which the illegally formed message 126 was received.

Thus, the two level schema validation techniques just described with respect to the browser schema validator 132 and the extension schema validator 134, in the context of the multi-process extension architecture of the system 100, enable easy detection of extension development errors, while providing assistance to developers who make such errors as honest mistakes that are part of the development process. Moreover, the described techniques also reliably detect and identify such unpermitted uses of the extension API 108 that may be attempted by the malicious developer of the extension 120, with a level of certainty sufficient to enable termination of any such extension process 124 determined in the manner described to be malicious.

As a result, malicious developers may be restricted or prevented from obtaining a desired malicious result, while legitimate developers may be facilitated in developing legitimate extensions for their own use or the use of others. In particular, in the example of FIG. 1, as illustrated, the two level validation of the extension 118 may result in acceptance of the extension 118 by the provider sites 104 for publication thereof within the gallery 116. As a result, any other user with access to the gallery 116 may subsequently download and utilize the extension 118, with confidence that the extension 118 is not malicious in its operations or intended results.

Figure 2:
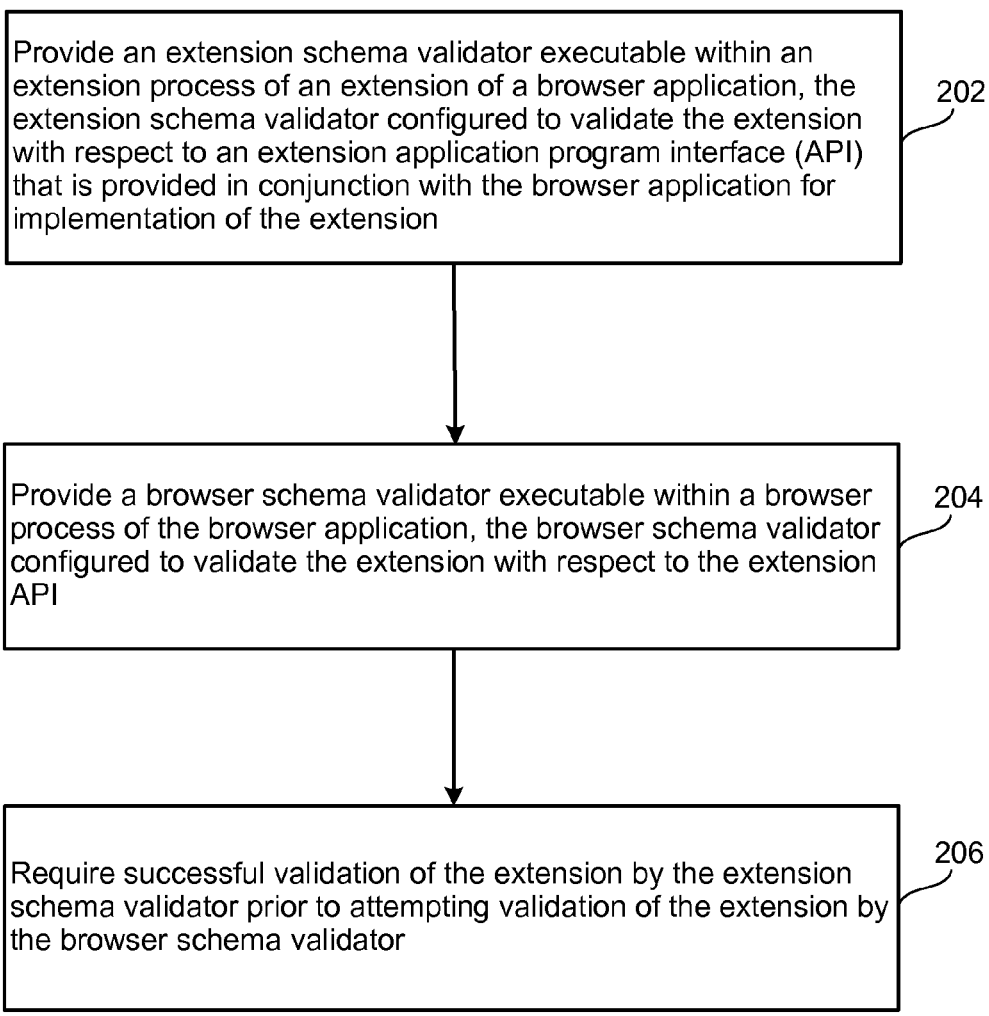
FIG. 2 is a flowchart illustrating example operations of the system of FIG. 1.

FIG. 2 is a flowchart 200 illustrating example operations of the system 100 of FIG. 1. In the example of FIG. 2, operations 202-206 are illustrated as separate, sequential operations. However, it may be appreciated that, in various implementations, the operations 202-206 may occur in a partially or completely overlapping or parallel manner, or may occur in a different order than that shown. Further, additional or alternative operations, not specifically illustrated in the example of FIG. 2, may be included, or one or more of the operations 202-206 may be partially or completely omitted.

In the example of FIG. 2, an extension schema validator executable within an extension process of an extension of a browser application may be provided, where the extension schema validator may be configured to validate the extension with respect to an extension application program interface (API) that is provided in conjunction with the browser application implementation of the extension (202). For example, the extension schema validator 134 may be provided and executable within the extension process 124. As described with respect to FIG. 1, the extension process 124 may execute utilizing the extension API 108 in conjunction with the browser application 106 for implementation of a corresponding extension, e.g., the extension 118 or the extension 120. As described above, the extension schema validator 134 may rely on the schema 110 to validate operations of the extension process 124 and the extension API 108.

A browser schema validator executable within a browser process of the browser application may also be provided, where the browser schema validator is configured to validate the extension with respect to the extension API (204). For example, the browser schema validator 132 may be provided within a process of the browser application 106. As also described above, the browser schema validator 132 may operate in a conceptually similar or identical manner as the extension schema validator 134, i.e., may execute to validate operations of the extension process 124 with respect to the extension API 108, and relative to the schema 110.

The successful validation of the extension by the extension schema validator may be required prior to attempting validation of the extension by the browser schema validator (206). For example, as described above, an initial development or execution of the extension process 124 may be associated with, and require, an operation of the extension schema validator 134. If the initial validation is unsuccessful, the extension schema validator 134 may generate and return an error message. If the response to the error message is successful in correcting the error, then a subsequent validation attempt by the extension schema validator 134 may be successful in completing the validation of the extension.

At that time, the extension process 124 may proceed with interacting with the browser application 106, thus initiating a validation attempt by the browser schema validator 132. As described above, any error found by the browser schema validator 132 at this stage may thus be inferred or considered to be representative of malicious efforts on the part of a corresponding developer (e.g., the malicious developer of the extension 120). This is true because, e.g., only such a malicious attempt would have, or could have, bypassed or circumvented the corresponding error message that would have been, or should have been, received and corrected in the context of the validation of the extension schema validator 134.

Figure 3:
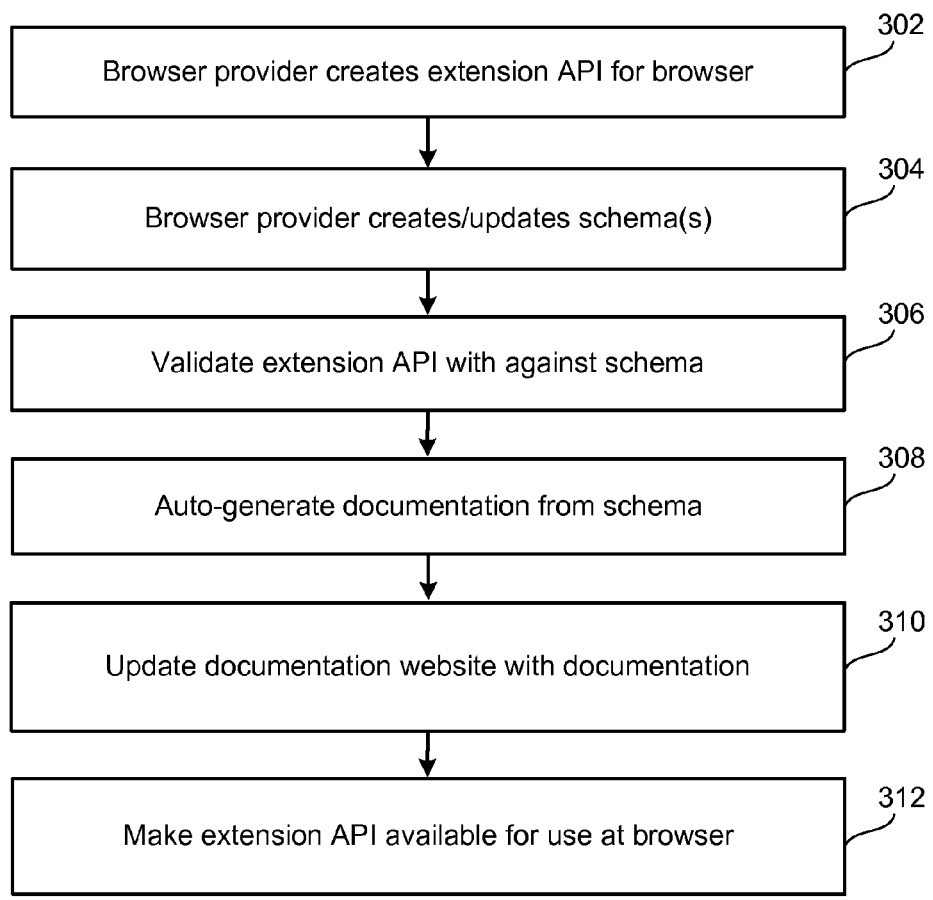
FIG. 3 is a second flowchart illustrating example operations of a browser provider of the system of FIG. 1.

FIG. 3 is a flowchart 300 illustrating example operations of a browser/extension provider. In the example of FIG. 3, the browser provider creates an extension API for use with a browser that is provided (302), e.g., creates the extension API 108 for use with the browser application 106.

The browser provider may also create or update an associated schema, e.g., the schema 110, that is associated with the extension API 108 (304). As described above, the schema 110 may be individually associated with the extension API 108, or may be more generally applicable to a group or class of extension APIs, e.g., may relate to a group or class of extension APIs which are associated with particular actions or types of actions of the browser application 106 (e.g., all extension APIs related to manipulation of a bookmark feature of the browser). The provider may validate the extension API 108 against the schema 110 (306), so as to ensure that the extension API 108 is fully and completely operational and available for use by potential future developers of associated extensions.

As described above, the schema 110 may be associated with various descriptive elements which provide information and context for particular features, content, and other characteristics of the extension API 108. Consequently, the auto updater 112 may be used to auto generate documentation for the extension API 108 from the schema 110 (308).

Subsequently, a corresponding extension documentation website may be updated with the extension documentation 114 generated by the auto updater 112 using the schema 110 (310). In this way, potential future developers may access the documentation website in order to gain knowledge and understanding relative for utilizing the extension API 108.

The extension API 108 may be made available for use at the browser application 106 (312). For example, as shown and described with respect to FIG. 1, the browser application 106 may be associated with an extension manager 130, and the newly-developed extension API 108 may be deployed, downloaded, installed, and implemented in conjunction therewith. Such modifications and characteristics of the browser application 106 may be implemented automatically by the provider, e.g., as an upgrade to the browser application 106, or may be proactively installed by a potential developer who wishes to utilize the extension API 108 as part of his or her extension development efforts.

Figure 4:
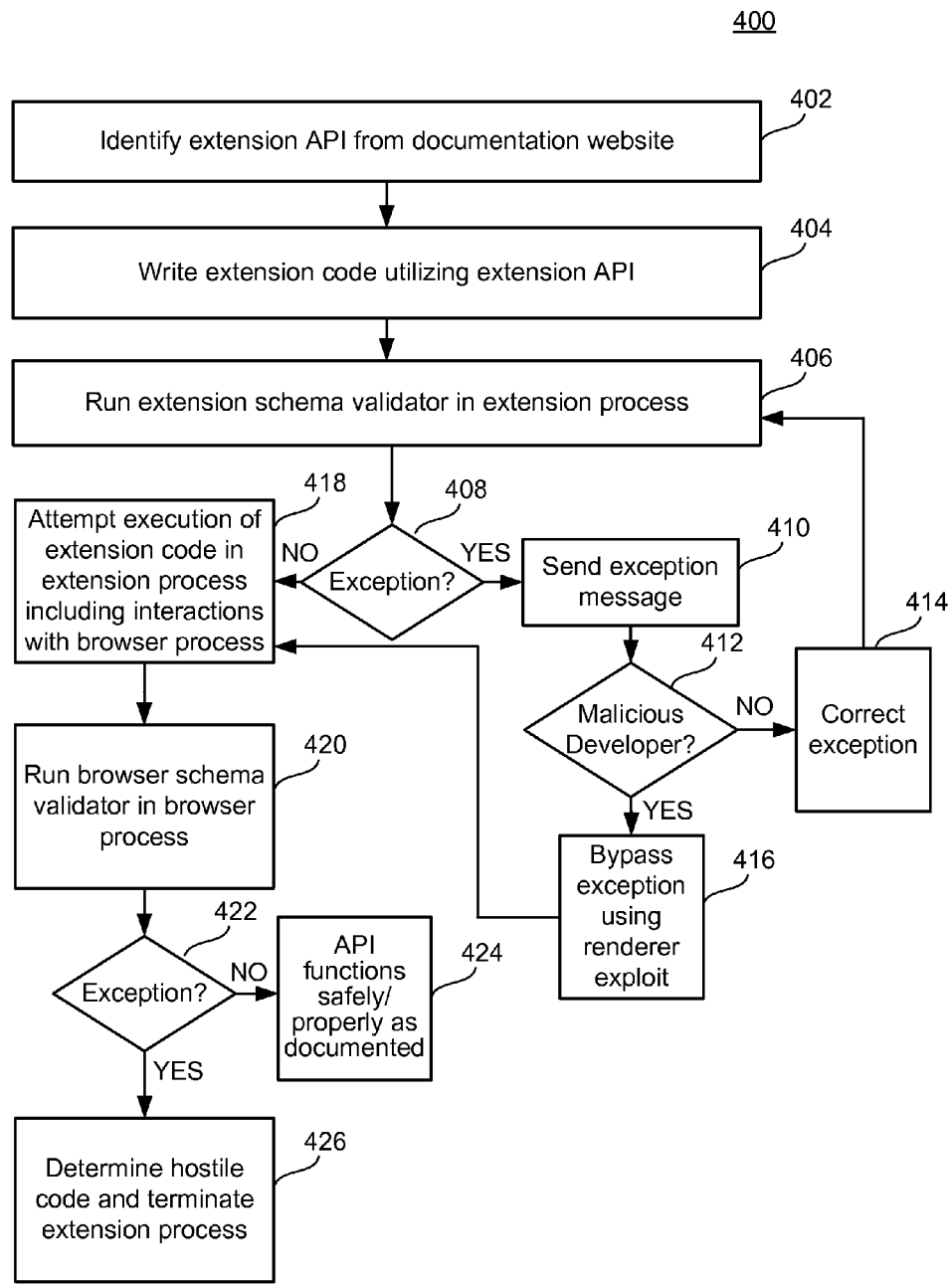
FIG. 4 is a third flowchart illustrating example developer operations with respect to the system of FIG. 1.

FIG. 4 is a flowchart 400 illustrating example operations of extension developers in the context of the system 100 of FIG. 1. In the example of FIG. 4, a developer may identify one or more particular extension APIs, e.g., the extension API 108, from a documentation website of a provider (e.g., a browser provider), including, for example, the extension documentation 114 available at a documentation website of the provider.

The developer may thereafter write extension code utilizing the extension API 108 (404). For example, many extension applications are written using JavaScript and JSON (JavaScript object notation) languages and conventions. Consequently, the schema 110 may be considered to be a JSON schema which characterizes and defines permitted characteristics of the extension API 108 in implementing such JavaScript/JSON extension applications (and related extension applications). For example, the schema 110 may define how various API bindings are exposed (injected) into corresponding Javascript code.

The extension schema validator 134 may thus be executed in the context of, or in association with, the extension process 124 (406). For example, the developer may write the code associated with a given application 118, 120, and may initially store the code at the local computing device 102. The extension schema validator 134 may thus access the code for validation thereof in the context of the extension process 124.

If the attempted validation thereof results in an error and associated exception message (408), then the extension schema validator 134 may generate and extend an exception message (410) to the developer.

If the developer is not a malicious developer (412), e.g., is the developer of the extension 118, then the developer may attempt to correct the exception (414), and then continue with the execution or re-execution of the extension schema validator (406), until no further exceptions are detected (408), whereupon execution of the extension doe in the extension process may proceed (418).

On the other hand, if the developer is a malicious developer (412), e.g., the malicious developer of the extension 120, then the malicious developer may bypass or circumvent the exception message using, e.g., a renderer exploit or other bug or unattended or erroneous characteristic of the rendering engine 128 ror the extension manager 130.

Execution of the extension code in the extension process may thus continue, including interactions (e.g., the messages 126) with the browser process of the browser application 106 (418). That is, the browser application 106 may receive the messages 126 or other information from the extension process 124 in the context of the sandbox 122. As shown, and as referenced above, the attempted execution of the extension code including interactions with browser processes (418) also may occur when no exception is detected by the extension schema validator 134.

In either case, the browser schema validator 132 may execute within the browser process of the browser application 106 (420). If an exception is not detected (422) by the browser schema validator 132, then the extension may be considered to be validated and successful, and the extension thus may be successfully deployed for future use by the developer or other users. That is, extension API 108 may be considered to function safely/properly as document (424). On the other hand, if an exception is detected (422) by the browser schema validator in the context of the browser process, then the browser schema validator may infer or otherwise determine that the extension in question (e.g., the extension 120) is hostile or malicious, and may immediately terminate the extension process 120 (426).

Consequently, as illustrated by the example operations of the flowchart 400, a non-malicious developer such as the developer of the extension 118 may experience only a single requirement to validate developed extension code. Moreover, the required validation is straightforward, and, moreover, may be helpful to the developer in terms of identifying and correcting unintended errors in extension code being developed by the non-malicious developer. On the other hand, malicious developers, such as the malicious developer of the extension 120, may, even if successful in exploiting a bug or other unattended characteristic of the browser application 106, find that his or her malicious extension will not be executed by the browser application 106. As a result, honest developers wishing merely to provide useful and beneficial extensions may do so in a convenient manner, without being unnecessarily restricted or burdened by the fact that malicious developers exist.

Figure 5:
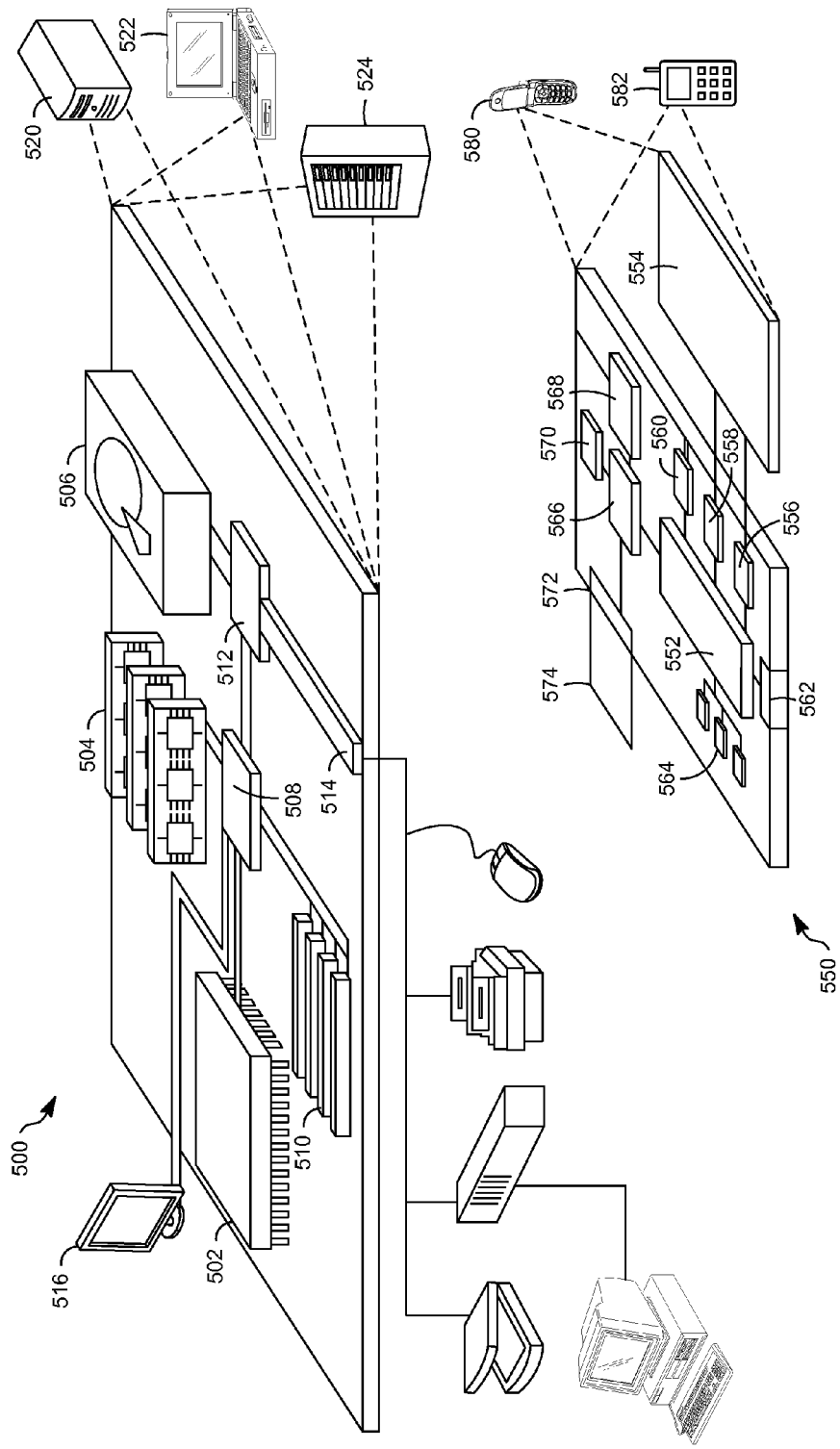
FIG. 5 is a block diagram showing example or representative computing devices and associated elements that may be used to implement the systems and methods of FIGS. 1-4.

FIG. 5 is a block diagram showing example or representative computing devices and associated elements that may be used to implement the systems of FIGS. 1 and 3. FIG. 5 shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552, that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning system) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or other similar mobile device.

Thus, various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It will be appreciated that the above embodiments that have been described in particular detail are merely example or possible embodiments, and that there are many other combinations, additions, or alternatives that may be included.

Also, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or "providing" or the like, refer to the action and processes of a computer system, or similar electronic computing device, that manipulates and transforms data represented as physical (electronic) quantities within the computer system memories or registers or other such information storage, transmission or display devices.

What is claimed is:

1. A computer system comprising:
  a non-transitory computer-readable medium storing instructions; and
  at least one processor configured to execute the instructions to provide
    an extension schema validator that is executable within an extension process of an extension, the extension process configured to execute within a browser application and further within a sandbox environment that isolates the extension process from other processes of the browser application, the extension schema validator configured to cause the at least one processor to attempt to validate the extension with respect to an extension application program interface (API) that is provided in conjunction with the browser application for implementation of the extension, and further configured to cause the at least one processor to provide an exception message in response to detecting an invalidity of the extension, wherein the extension thereafter begins execution including sending at least one extension message from the sandbox environment to the extension API to conduct the execution of the extension by the browser application;
    a browser schema validator executable within a browser process of the browser application, the browser schema validator configured to cause the at least one processor to receive the extension message and attempt to validate the extension again with respect to the extension API, based on the at least one extension message, and further configured to cause the at least one processor to detect the invalidity and suspend the execution of the extension, based on the invalidity.

2. The system of claim 1, wherein the extension schema validator and the browser schema validator execute the validation of the extension using a schema defining acceptable form and content of an attempt of the extension to use the extension API.

3. The system of claim 2, wherein the extension schema validator is configured to determine a failure of the extension to conform with the schema, and further configured to generate the exception message, based on the failure.

4. The system of claim 1, wherein a determination of successful validation of the extension by the extension schema validator prior to attempting validation of the extension by the browser schema validator is required, the determination of successful validation erroneously allowing the extension to proceed with execution without correction of the invalidity.

5. The system of claim 4, wherein the attempted validation by the browser schema validator includes repeating a portion of the attempted validation by the extension schema validator, and determining the invalidity in the portion.

6. The system of claim 4, wherein the browser schema validator is configured to determine a circumvention of the requiring of the determination of successful validation of the extension by the extension schema validator, based on the invalidity.

7. The system of claim 6, wherein the circumvention relies on a renderer exploit of a bug in a rendering engine of the browser application.

8. The system of claim 1 wherein the browser schema validator is written for a first computing language associated with the browser process, and the extension schema validator is written for a second computing language associated with the extension process.

9. The system of claim 8 wherein the browser process and the extension process communicate via messages exchanged via a messaging API, including the at least one extension message.

10. The system of claim 1, wherein the extension schema validator is configured to attempt to validate the extension during a development of the extension.

11. A computer program product, the computer program product being tangibly embodied on a non-transitory computer-readable medium and including executable code that, when executed, is configured to cause a data processing apparatus to:
provide an extension schema validator that is executable within an extension process of an extension, the extension process configured to execute within a browser application and further within a sandbox environment that isolates the extension process from other processes of the browser application, the extension schema validator configured to attempt to validate the extension with respect to an extension application program interface (API) that is provided in conjunction with the browser application for implementation of the extension, and further configured to provide an exception message in response to detecting an invalidity of the extension, wherein the extension thereafter begins execution including sending at least one extension message from the sandbox environment to the extension API to conduct the execution of the extension by the browser application;
provide a browser schema validator executable within a browser process of the browser application, the browser schema validator configured to receive the extension message and attempt to validate the extension again with respect to the extension API, based on the at least one extension message, and further configured to detect the invalidity and suspend the execution of the extension, based on the invalidity.

12. The computer program product of claim 11, wherein the extension schema validator and the browser schema validator execute the validation of the extension using a schema defining acceptable form and substance of an attempt of the extension to use the extension API.

13. The computer program product of claim 12, wherein the code, when executed, causes the data processing apparatus to:
determine, at the extension schema validator, a failure of the extension to conform with the schema; and
generate the exception message, based on the failure.

14. The computer program product of claim 11, wherein a determination of successful validation of the extension by the extension schema validator prior to attempting validation of the extension by the browser schema validator is required, the determination of successful validation erroneously allowing the extension to proceed with execution without correction of the invalidity.

15. The computer program product of claim 14, wherein the attempted validation by the browser schema validator includes repeating a portion of the attempted validation by the extension schema validator, and determining the invalidity in the portion.

16. The computer program product of claim 14, wherein the code, when executed, causes the data processing apparatus to:
determine, at the browser schema validator, a circumvention of the requiring of the determination of successful validation of the extension by the extension schema validator, based on the invalidity.

17. A computer-implemented method including executing instructions stored on a computer-readable medium, the method comprising:
providing an extension schema validator that is executable within an extension process of an extension of a browser application, the extension schema validator configured to attempt to validate the extension with respect to an extension application program interface (API) that is provided in conjunction with the browser application for implementation of the extension, and further configured to provide an exception message in response to detecting an invalidity of the extension, wherein the extension thereafter begins execution including sending at least one extension message to conduct the execution of the extension by the browser application;
providing a browser schema validator executable within a browser process of the browser application, the browser schema validator configured to receive the extension message and, without having received a notification of the invalidity from the extension schema validator, attempt to validate the extension again with respect to the extension API, based on the at least one extension message, and further configured to detect the invalidity and suspend the execution of the extension, based on the invalidity.

18. The method of claim 17, wherein the extension schema validator and the browser schema validator execute the validation of the extension using a schema defining acceptable form and content of an attempt of the extension to use the extension API.

19. The method of claim 18, wherein the extension schema validator is configured to determine a failure of the extension to conform with the schema, and further configured to generate the exception message, based on the failure.

20. The method of claim 17, wherein a determination of successful validation of the extension by the extension schema validator prior to attempting validation of the extension by the browser schema validator is required, the determination of successful validation erroneously allowing the extension to proceed with execution without correction of the invalidity.

* * * * *